United States Patent
Day et al.

(10) Patent No.: US 7,494,051 B1
(45) Date of Patent: Feb. 24, 2009

(54) MULTI-FUNCTIONAL ELECTRONIC PERSONAL ORGANIZER

(76) Inventors: Michael A. Day, 25 NE. 158th St., North Miami, FL (US) 33162; Sabin L. Edwards, 275 NE. 154th St., North Miami Beach, FL (US) 33162

( * ) Notice: Subject to any disclaimer, the term of this patent is extended or adjusted under 35 U.S.C. 154(b) by 555 days.

(21) Appl. No.: 11/213,408

(22) Filed: Aug. 29, 2005

(51) Int. Cl.
*G07D 11/00* (2006.01)
(52) U.S. Cl. ........................... 235/379; 235/382
(58) Field of Classification Search ....................
235/472.01–472.03, 379, 382, 375; 705/40;
221/154
See application file for complete search history.

(56) References Cited

U.S. PATENT DOCUMENTS

| | | | |
|---|---|---|---|
| 5,520,544 | A | 5/1996 | Manico et al. |
| 5,940,121 | A | 8/1999 | Mcintyre et al. |
| 6,072,980 | A | 6/2000 | Manico et al. |
| 6,111,586 | A | 8/2000 | Ikeda et al. |
| 6,244,514 | B1 * | 6/2001 | Otto ........................... 235/492 |
| 6,269,238 | B1 | 7/2001 | Iggulden |
| D446,809 | S | 8/2001 | Parker |
| 2004/0158816 | A1 * | 8/2004 | Pandipati et al. ............. 717/120 |
| 2004/0169722 | A1 * | 9/2004 | Pena ........................ 348/14.01 |
| 2005/0015338 | A1 * | 1/2005 | Lee .............................. 705/40 |
| 2005/0240970 | A1 * | 10/2005 | Schwalb et al. ............... 725/78 |
| 2007/0022098 | A1 * | 1/2007 | Malik ............................ 707/3 |
| 2007/0190497 | A1 * | 8/2007 | Moeller et al. ................ 434/80 |
| 2008/0006649 | A1 * | 1/2008 | Masters et al. .............. 221/154 |

* cited by examiner

*Primary Examiner*—Thien M Le

(57) ABSTRACT

An electronic device includes a body including first and second sections selectively adaptable between open and closed positions. Each section has a linear edge defining an axis about which the sections are pivotal. The first and second sections are coextensively shaped. Mechanisms are included for digitally storing and displaying photographic images and digitally storing and displaying personal contact information, and are housed within the first body section. A mechanism is included for locking the sections at a closed position, and includes a speaker and a transceiver communicating therewith for emitting a distress signal when an unauthorized user attempts to access the device. Money bill and a credit card holding sections are connected to the second section. The credit card section lies on top of the money bill section when articulated to a stored position. An internal power supply source is coupled to the contact and image storing and displaying mechanisms.

18 Claims, 5 Drawing Sheets

MULTI-FUNCTIONAL ELECTRONIC PERSONAL ORGANIZER

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to personal organizers and, more particularly, to a multi-functional electronic personal organizer for housing photographic memorabilia and monetary items therein.

2. Prior Art

With the advent of microelectronics, integrated circuits, sound-recording microchips, etc., smaller and smaller sized consumer products are incorporating electronic devices to enhance their usefulness. One example is the recent advancements made in digital photography. Capturing an image for subsequent review often involves activating a camera to record a digital representation of the image. The image is recorded as a digital data in a memory. Photofinishing of the recorded image generates, in one form, a reproduction of the image superimposed on a paper backing. The reproduction, or print, may then be stored with a collection of prints in a photo album.

Subsequent review of a conventional image print often triggers recall of many of the events related to the image. Often a person wishes to share such pictures and memories with friends, family and co-workers. Unfortunately, carrying those pictures about in a conventionally bound photo album is not very appealing, nor is it feasible, since the person would quickly tire of carrying about the heavy photo album.

Accordingly, a need remains for a multi-functional electronic personal organizer for housing photographic memorabilia in order to overcome the above-noted shortcomings. The present invention satisfies such a need by providing an electronic personal organizer that is light weight and portable in design, results in convenient space savings, and is easy to use. Instead of settling for a single, or few, photos in a wallet, the electronic personal organizer incorporates an entire electronic photo album therein. Thus, the user has access to hundreds of photos to share with whomever they wish. The photos are displayed on a full color Liquid Crystal Display (LCD) screen that is built into the device. Such an electronic personal organizer device is also self-protecting. A correct access code is required to gain access to the device, and if an incorrect code is entered a transmitter begins to transmit the location of the device, enabling quick and easy recovery thereof.

BRIEF SUMMARY OF THE INVENTION

In view of the foregoing background, it is therefore an object of the present invention to provide a multi-functional electronic personal organizer. These and other objects, features, and advantages of the invention are provided by a portable electronic device for housing photographic memorabilia and monetary items therein.

The electronic device includes a body including pivotally conjoined first and second sections selectively adaptable between open and closed positions. Each of the first and second sections has a linear longitudinal edge defining a fulcrum axis about which the first and second sections are effectively pivotal. Such first and second sections are coextensively shaped. The first section may be provided with a notch for effectively receiving the money bill holding section and the credit card holding section therein so that the first and second sections can advantageously be directly mated when the body of the device is biased to the closed position.

A mechanism is included for digitally storing and displaying a plurality of photographic images. Such an image storing and displaying mechanism is mounted to the first section of the body. The image storing and displaying mechanism preferably includes a touch screen and a plurality of controls directly mounted on an outer surface of the first section. Such controls receive a user input and transmit a corresponding control signal based upon the user input. A processor is included for receiving the control signal. The image storing and displaying mechanism may further include a memory including preprogrammed software instructions. Such instructions cause the device to perform the steps of prompting a user to select a database unique to a group of the images, accessing the database based upon the control signal, sequentially displaying each of the images on the display screen such that the user can selectively toggle through the images as desired, and prompting the user whether to store or delete each image during playback conditions.

A mechanism is included for digitally storing and displaying personal contact information. Such a contact storing and displaying mechanism is housed within the first section of the body. An internal power supply source is electrically coupled to the contact storing and displaying mechanism as well as the image storing and displaying mechanism.

A mechanism is included for locking the first and second sections at the closed position such that unauthorized access to the body is prohibited. Such a locking mechanism includes a speaker and a transceiver operably communicating therewith for advantageously and effectively emitting a distress signal when an unauthorized user attempts to access the locking mechanism. The locking mechanism preferably includes a solenoid-actuated lock directly and operably conjoined to the first section. A latching arm is pivotally mounted directly to the keyed lock. An access key is included for disengaging the latching arm from a locked position such that the first and second sections can effectively be adapted to the open position.

A money bill holding section is pivotally connected directly to the second section. Such a money bill holding section preferably includes a body provided with a plurality of slots formed therein. The slots are equidistantly spaced and extend parallel to each other wherein the slots are suitably sized and shaped for conveniently receiving and isolating a plurality of money bills therein. The body includes a monolithically formed top flap that has hook and loop fasteners attached thereto. Such a flap is situated over a top opening of the body for preventing the money bills from becoming displaced out from the slots.

A credit card holding section is pivotally connected directly to the second section and selectively engageable directly with the money bill holding section in such a manner that the credit card holding section lays flat on top of the money bill holding section when articulated to a stored position. Such a credit card holding section may include a rigid support plate extending outwardly from the fulcrum axis that includes a plurality of pockets laterally juxtaposed along a length thereof. Each pocket includes a top flap adaptable between open and closed positions wherein the pockets are suitably sized and shaped for receiving credit cards therein. The support plate is independently pivotal away from the body of the money bill holding section.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
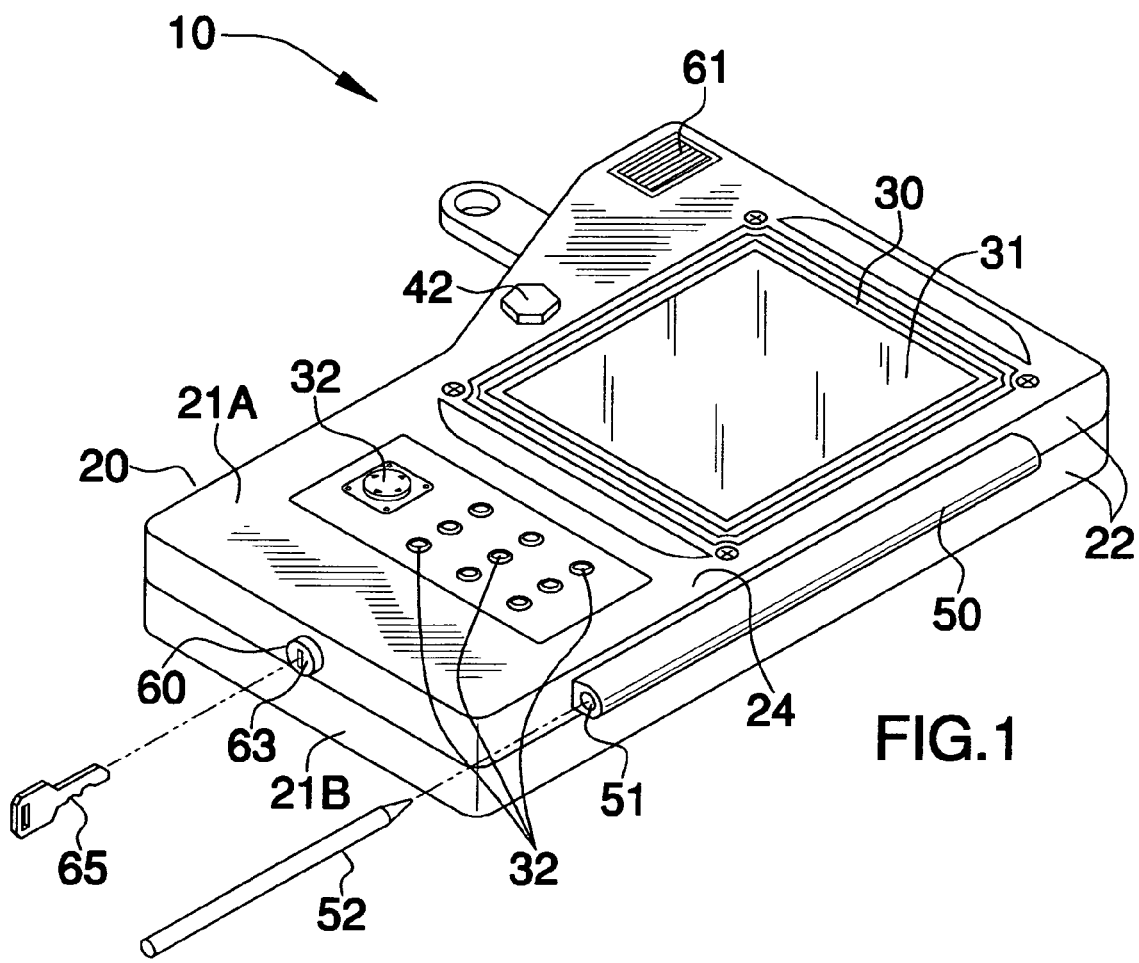
FIG. 1 is a perspective view showing a multi-functional electronic personal organizer for housing photographic memorabilia and monetary items therein, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The device of this invention is referred to generally in FIGS. 1-6 by the reference numeral 10 and is intended to provide a multi-functional electronic personal organizer. It should be understood that the device 10 may be used to store many different types of electronic data and should not be limited in use to only storing photo and address information.

Referring initially to FIGS. 1 through 5, the device 10 includes a body 20 including pivotally conjoined first 21A and second 21B sections selectively adaptable between open and closed positions. Each of the first 21A and second 21B sections has a linear longitudinal edge 22 defining a fulcrum axis about which the first 21A and second 21B sections are effectively pivotal. This feature is essential and advantageous for allowing the device 10 to be adapted to a more compact shape for easy transport and storage thereof. Such first 21A and second 21B sections are coextensively shaped for effectively forming a uniformly shaped body when adapted to the closed position. Of course, the body 20 may be produced in a variety of different shapes, sizes and colors so as to appeal to various persons' needs, as is obvious to a person of ordinary skill in the art.

The second section 21B is provided with a notch 23 that is critical for effectively receiving the money bill holding section 25A (described herein below) and the credit card holding section 25B (described herein below) therein so that the first 21A and second 21B sections can advantageously be directly mated, without the use of intervening elements, when the body 20 of the device 10 is biased to the closed position. This feature, again, is vital for allowing the device 10 to assume a compact shape that allows for easy and convenient transport and storage thereof.

Referring to FIGS. 1, 2, 4 and 6, a mechanism 30 is included for digitally storing and displaying a plurality of photographic images. Such an image storing and displaying mechanism 30 is mounted to the first section 21A of the body 20. The image storing and displaying mechanism 30 includes a touch screen display 31 and a plurality of controls 32 directly mounted, without the use of intervening elements, on an outer surface 24 of the first section 21A. Such controls 32 are crucial for receiving a user input and transmit a corresponding control signal based upon the user input. A processor 33 is included for receiving the control signal.

The image storing and displaying mechanism 30 further includes a memory 34 including preprogrammed software instructions. Such instructions cause the device 10 to perform the steps of prompting a user to select a database 35 unique to a group of the images, accessing the database 35 based upon the control signal, sequentially displaying each of the images on the touch screen display 31 such that the user can selectively and conveniently toggle through the images as desired, and prompting the user whether to store or delete each image during playback conditions.

Referring to FIGS. 1, 2, 5 and 6, a mechanism 40 is included for digitally storing and displaying personal contact information. Such a contact storing and displaying mechanism 40 is housed within the first section 21A of the body 20. An internal power supply source 41 is electrically coupled to the contact storing and displaying mechanism 40 as well as the image storing and displaying mechanism 30. Such an internal power supply source 41 includes an ON/OFF button 42 electrically mated directly thereto that is important convenient for toggling the device 10 between operating and non-operating modes. This feature advantageously allows a user to conserve the internal power supply source for longer period of use.

Referring to FIG. 1, the device 10 further includes a sleeve 50 that is monolithically formed with the linear edge 22 of the first section 21A. Such a sleeve 50 has a bore 51 formed therein along the longitudinal axis. A pointing implement 52 is slidably engageable within the bore 51, which is important for conveniently storing the pointing implement 52 during transport and other periods of non-use. Such a pointing implement 52 advantageously allows a user to access the database 35 by simply touching the touch screen display 31.

Figure 2:
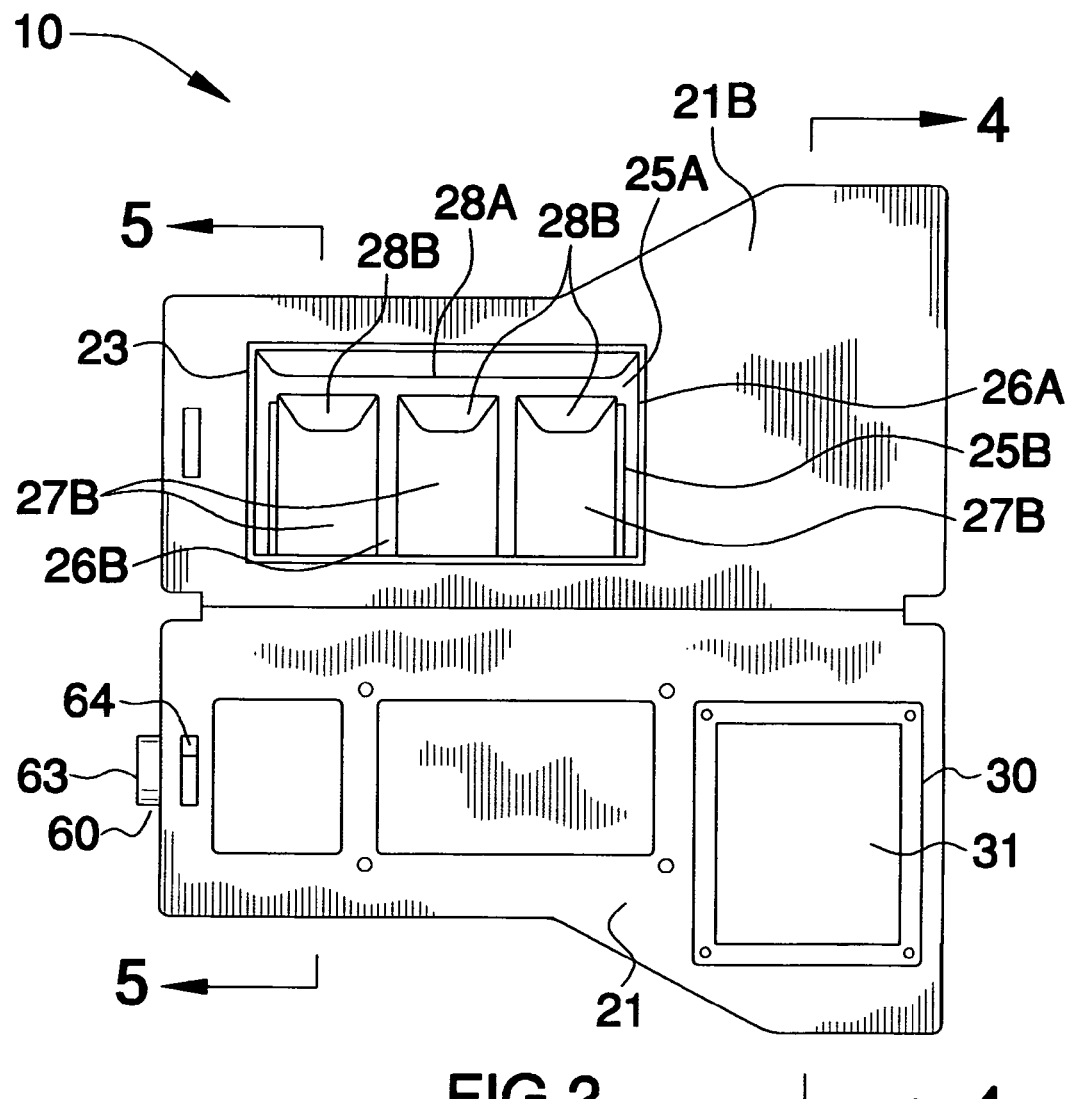
FIG. 2 is a top plan view of the device shown in FIG. 1, showing the first and second sections pivoted to an open position.
Figure 3:
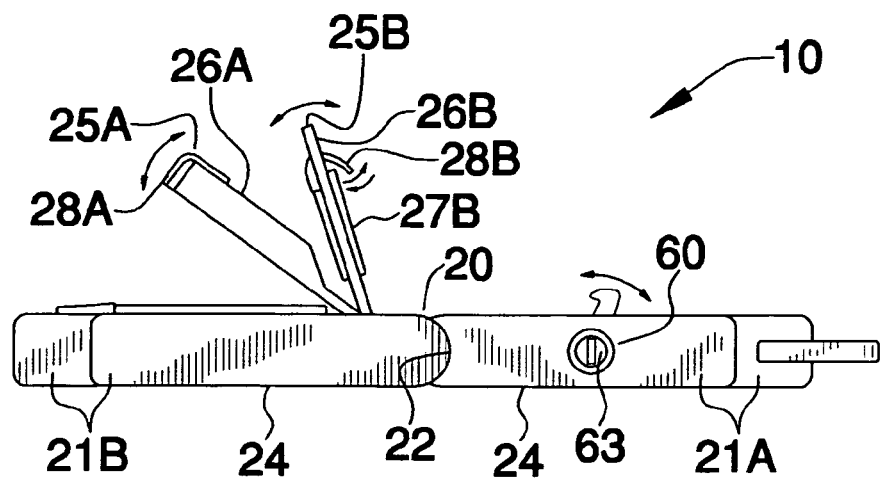
FIG. 3 is a side-elevational view of the device shown in FIG. 1.
Figure 4:
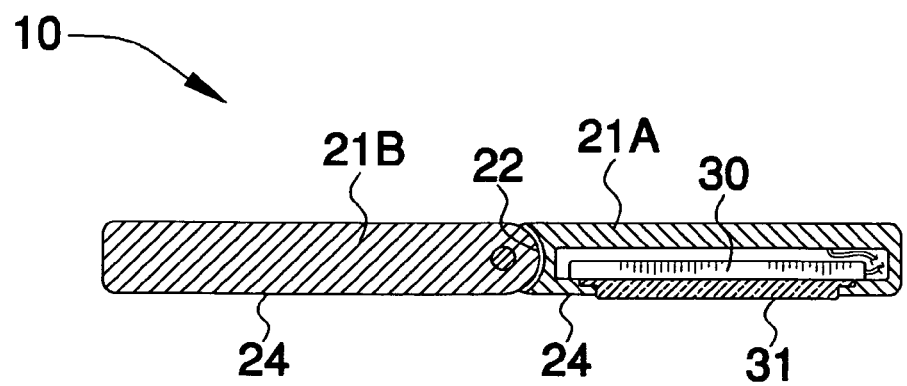
FIG. 4 is a cross-sectional view of the device shown in FIG. 2, taken along line 4-4 and showing the notch for receiving the money bill holding section and the credit card holding section therein.

Referring to FIGS. 1 through 3, a mechanism 60 is included for locking the first 21A and second 21B sections at the closed position such that unauthorized access to the body 20 is prohibited. Such a locking mechanism 60 includes a speaker 61 and a transceiver 62 operably communicating therewith, which is vital for advantageously and effectively emitting a distress signal when an unauthorized user attempts to access the locking mechanism 60. The locking mechanism 60 includes a solenoid-actuated lock 63 directly and operably conjoined, without the use of intervening elements, to the first section 21A. A latching arm 64 is pivotally mounted directly, without the use of intervening elements, to the keyed lock 63. An access key 65 is included for effectively disengaging the latching arm 64 from a locked position such that the first 21A and second 21B sections can effectively be adapted to the open position.

Figure 5:
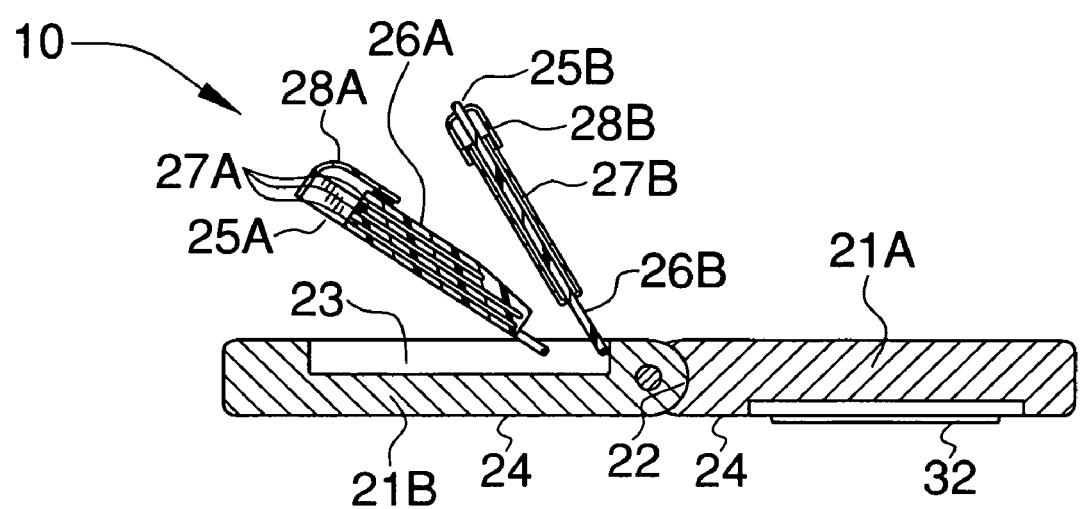
FIG. 5 is a cross-sectional view of the device shown in FIG. 2, taken along line 5-5.
Figure 6:
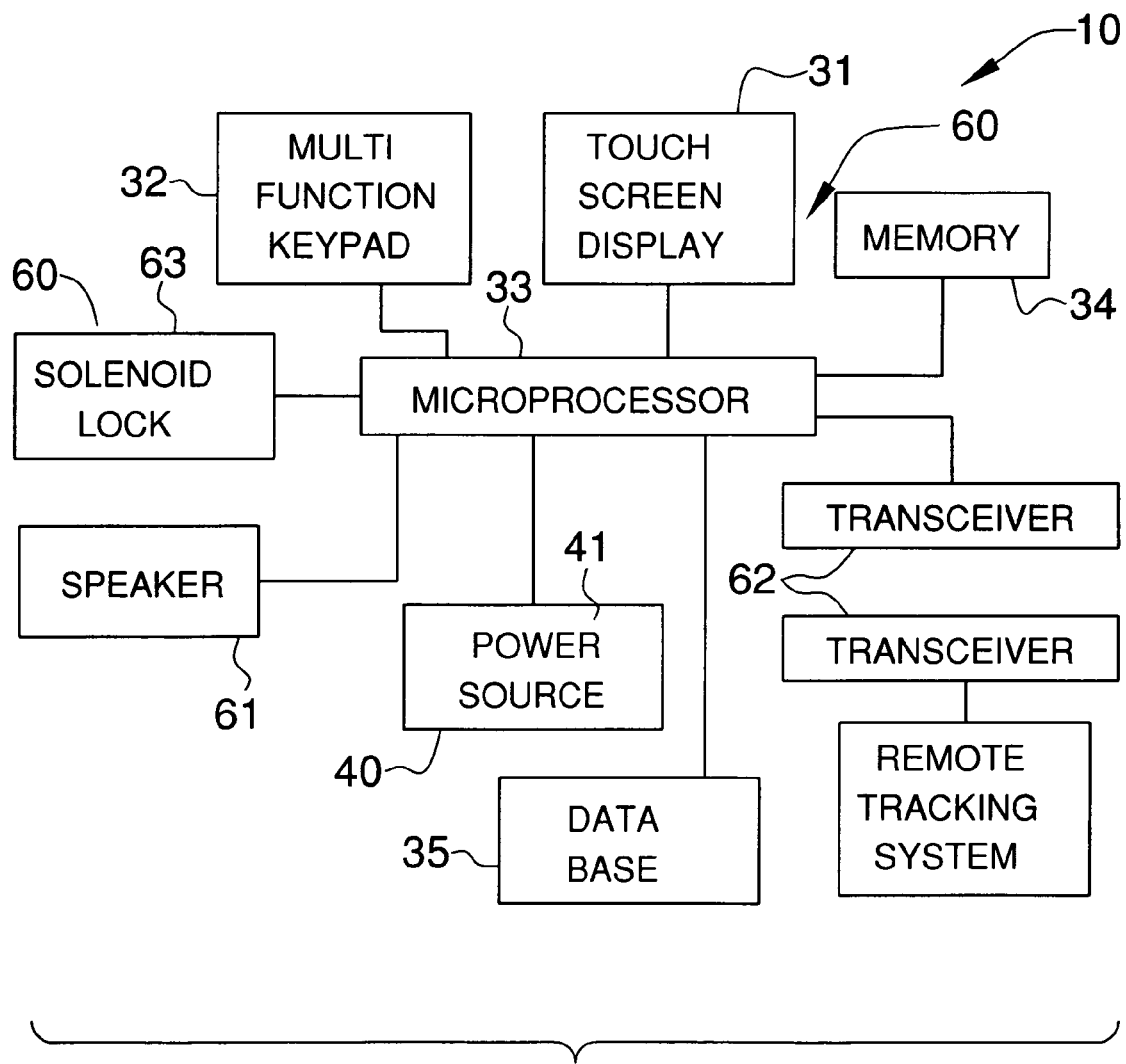
FIG. 6 is a schematic block diagram of the device shown in FIG. 1.

Referring to FIGS. 2, 3 and 5, a money bill holding section 25A is pivotally connected directly, without the use of intervening elements, to the second section 21B. Such a money bill holding section 25A includes a body 26A provided with a plurality of slots 27A formed therein. The slots 27A are equidistantly spaced and extend parallel to each other wherein the slots 27A are suitably sized and shaped for conveniently receiving and isolating a plurality of money bills therein. The body 26A includes a monolithically formed top flap 28A that has hook and loop fasteners 29 attached thereto. Such a flap 28A is situated over a top opening of the body 26A, which is essential and advantageously for preventing the money bills from becoming displaced out from the slots 27A.

Still referring to FIGS. 2, 3 and 5, a credit card holding section 25B is pivotally connected directly, without the use of intervening elements, to the second section 21B and is selectively engageable directly, without the use of intervening elements, with the money bill holding section 25A in such a manner that the credit card holding section 25B lays flat on top of the money bill holding section 25A when articulated to a stored position. Such a credit card holding section 25B includes a rigid support plate 26B extending outwardly from the fulcrum axis that includes a plurality of pockets 27B laterally juxtaposed along a length thereof. Each pocket 27B includes a top flap 28B adaptable between open and closed positions wherein the pockets 27B are suitably sized and shaped for receiving credit cards therein. Of course, other cards, such as business cards, may be housed in the pockets 28B, as is obvious to a person of ordinary skill in the art. The support plate 26B is independently pivotal away from the body 26A of the money bill holding section 25A.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A portable electronic device for housing photographic memorabilia and monetary items therein, said electronic device comprising:
    a body including pivotally conjoined first and second sections selectively adaptable between open and closed positions, each said first and second sections having a linear longitudinal edge defining a fulcrum axis about which said first and second sections are pivotal;
    means for digitally storing and displaying a plurality of photographic images, said image storing and displaying means being mounted to said first section of said body;
    means for digitally storing and displaying personal contact information wherein said contact storing and displaying means is housed within said first section of said body;
    means for locking said first and second sections at the closed position such that unauthorized access to said body is prohibited;
    a money bill holding section pivotally connected directly to said second section;
    a credit card holding section pivotally connected directly to said second section and selectively engageable directly with said money bill holding section in such a manner that said credit card holding section lays flat on top of said money bill holding section when articulated to a stored position; and
    an internal power supply source electrically coupled to said contact storing and displaying means as well as said image storing and displaying means.

2. The device of claim 1, wherein said image storing and displaying means comprises:
    a touch screen and a plurality of controls directly mounted on an outer surface of said first section, said controls for receiving a user input and transmitting a corresponding control signal based upon the user input;
    a processor for receiving said control signal; and
    a memory including preprogrammed software instructions that cause said device to perform the steps of:
        prompting a user to select a database unique to a group of said images,
        accessing said database based upon said control signal,
        sequentially displaying each said images on said touch screen such that the user can selectively toggle through said images as desired, and
        prompting the user whether to store or delete each said images during playback conditions.

3. The device of claim 1, wherein said locking means comprises:
    a solenoid-actuated lock directly and operably conjoined to said first section;
    a latching arm pivotally mounted directly to said solenoid-actuated lock; and
    an access key for disengaging said latching arm from a locked position such that said first and second sections can be adapted to the open position.

4. The device of claim 1, wherein said money bill holding section comprises:
    a body provided with a plurality of slots formed therein, said slots being equidistantly spaced and extending parallel to each other wherein said slots are suitably sized and shaped for receiving and isolating a plurality of money bills therein, said body of said money bill holding section including a monolithically formed top flap having hook and loop fasteners attached thereto, said flap being situated over a top opening of said body of said money bill holding section for preventing the money bills from becoming displaced out from said slots.

5. The device of claim 4, wherein said credit card holding section comprises:

a rigid support plate extending outwardly from the fulcrum axis and including a plurality of pockets laterally juxtaposed along a length thereof, each said pockets including a top flap adaptable between open and closed positions wherein said pockets are suitably sized and shaped for receiving credit cards therein, said support plate being independently pivotal away from said body of said money bill holding section.

6. The device of claim 1, wherein said second section is provided with a notch for receiving said money bill holding section and said credit card holding section therein so that said first and second sections can be directly mated when said body of said device is biased to the closed position.

7. A portable electronic device for housing photographic memorabilia and monetary items therein, said electronic device comprising:

a body including pivotally conjoined first and second sections selectively adaptable between open and closed positions, each said first and second sections having a linear longitudinal edge defining a fulcrum axis about which said first and second sections are pivotal;

means for digitally storing and displaying a plurality of photographic images, said image storing and displaying means being mounted to said first section of said body;

means for digitally storing and displaying personal contact information wherein said contact storing and displaying means is housed within said first section of said body;

means for locking said first and second sections at the closed position such that unauthorized access to said body is prohibited, wherein said locking means comprises:

a speaker and a transceiver operably communicating therewith for emitting a distress signal when an unauthorized user attempts to access said locking means;

a money bill holding section pivotally connected directly to said second section;

a credit card holding section pivotally connected directly to said second section and selectively engageable directly with said money bill holding section in such a manner that said credit card holding section lays flat on top of said money bill holding section when articulated to a stored position; and an internal power supply source electrically coupled to said contact storing and displaying means as well as said image storing and displaying means.

8. The device of claim 7, wherein said image storing and displaying means comprises:

a touch screen and a plurality of controls directly mounted on an outer surface of said first section, said controls for receiving a user input and transmitting a corresponding control signal based upon the user input;

a processor for receiving said control signal; and a memory including preprogrammed software instructions that cause said device to perform the steps of:

prompting a user to select a database unique to a group of said images, accessing said database based upon said control signal, sequentially displaying each said images on said touch screen such that the user can selectively toggle through said images as desired, and prompting the user whether to store or delete each said images during playback conditions.

9. The device of claim 7, wherein said locking means comprises:

a solenoid-actuated lock directly and operably conjoined to said first section;

a latching arm pivotally mounted directly to said solenoid-actuated lock; and an access key for disengaging said latching arm from a locked position such that said first and second sections can be adapted to the open position.

10. The device of claim 7, wherein said money bill holding section comprises:

a body provided with a plurality of slots formed therein, said slots being equidistantly spaced and extending parallel to each other wherein said slots are suitably sized and shaped for receiving and isolating a plurality of money bills therein, said body of said money bill holding section including a monolithically formed top flap having hook and loop fasteners attached thereto, said flap being situated over a top opening of said body of said money bill holding section for preventing the money bills from becoming displaced out from said slots.

11. The device of claim 10, wherein said credit card holding section comprises:

a rigid support plate extending outwardly from the fulcrum axis and including a plurality of pockets laterally juxtaposed along a length thereof, each said pockets including a top flap adaptable between open and closed positions wherein said pockets are suitably sized and shaped for receiving credit cards therein, said support plate being independently pivotal away from said body of said money bill holding section.

12. The device of claim 7, wherein said second section is provided with a notch for receiving said money bill holding section and said credit card holding section therein so that said first and second sections can be directly mated when said body of said device is biased to the closed position.

13. A portable electronic device for housing photographic memorabilia and monetary items therein, said electronic device comprising:

a body including pivotally conjoined first and second sections selectively adaptable between open and closed positions, each said first and second sections having a linear longitudinal edge defining a fulcrum axis about which said first and second sections are pivotal, wherein said first and second sections are coextensively shaped;

means for digitally storing and displaying a plurality of photographic images, said image storing and displaying means being mounted to said first section of said body;

means for digitally storing and displaying personal contact information wherein said contact storing and displaying means is housed within said first section of said body;

means for locking said first and second sections at the closed position such that unauthorized access to said body is prohibited, wherein said locking means comprises:

a speaker and a transceiver operably communicating therewith for emitting a distress signal when an unauthorized user attempts to access said locking means;

a money bill holding section pivotally connected directly to said second section;

a credit card holding section pivotally connected directly to said second section and selectively engageable directly with said money bill holding section in such a manner that said credit card holding section lays flat on top of said money bill holding section when articulated to a stored position; and an internal power supply source electrically coupled to said contact storing and displaying means as well as said image storing and displaying means.

14. The device of claim 13, wherein said image storing and displaying means comprises:

a touch screen and a plurality of controls directly mounted on an outer surface of said first section, said controls for receiving a user input and transmitting a corresponding control signal based upon the user input;

a processor for receiving said control signal; and a memory including preprogrammed software instructions that cause said device to perform the steps of:

prompting a user to select a database unique to a group of said images, accessing said database based upon said control signal, sequentially displaying each said images on said touch screen such that the user can selectively toggle through said images as desired, and prompting the user whether to store or delete each said images during playback conditions.

15. The device of claim 13, wherein said locking means comprises:

a solenoid-actuated lock directly and operably conjoined to said first section;

a latching arm pivotally mounted directly to said solenoid-actuated lock; and an access key for disengaging said latching arm from a locked position such that said first and second sections can be adapted to the open position.

16. The device of claim 13, wherein said money bill holding section comprises:

a body provided with a plurality of slots formed therein, said slots being equidistantly spaced and extending parallel to each other wherein said slots are suitably sized and shaped for receiving and isolating a plurality of money bills therein, said body of said money bill holding section including a monolithically formed top flap having hook and loop fasteners attached thereto, said flap being situated over a top opening of said body of said money bill holding section for preventing the money bills from becoming displaced out from said slots.

17. The device of claim 16, wherein said credit card holding section comprises:

a rigid support plate extending outwardly from the fulcrum axis and including a plurality of pockets laterally juxtaposed along a length thereof, each said pockets including a top flap adaptable between open and closed positions wherein said pockets are suitably sized and shaped for receiving credit cards therein, said support plate being independently pivotal away from said body of said money bill holding section.

18. The device of claim 13, wherein said second section is provided with a notch for receiving said money bill holding section and said credit card holding section therein so that said first and second sections can be directly mated when said body of said device is biased to the closed position.

* * * * *